United States Patent Office 3,557,073
Patented Jan. 19, 1971

3,557,073
PRODUCTION OF A POLYMER HAVING DIHALO-s-TRIAZINYL GROUPS BOUND THERETO
Garth Kay, London, England, assignor to National Research Development Corporation, London, England, a British corporation
No Drawing. Filed June 26, 1968, Ser. No. 740,043
Claims priority, application Great Britain, July 3, 1967, 30,616/67
Int. Cl. C08f 27/08
U.S. Cl. 260—91.3
15 Claims

ABSTRACT OF THE DISCLOSURE

A process for the production of a polymer having dihalo-s-triazinyl groups bound thereto which comprises contacting a polymer having nucleophilic groups with a solution of a cyanuric halide in an inert water-miscible organic solvent in the presence of water and maintaining an acid or neutral pH after reaction has occurred whereby the tendency to hydrolysis and cross-linking of the polymer is substantially reduced.

---

This invention relates to the production of a polymer having dihalo-s-triazinyl groups bound thereto.

If it is desired to bind a compound containing free amino groups such as a dye onto a polymer having nucleophilic groups such as cellulose, it is usually necessary to use a coupling agent which is first reacted with one component, i.e. with either the polymer or the compound to be bound to form an intermediate which is then reacted with the other component. When the compound to be bound is an unstable compound, it is desirable that the coupling agent should be first reacted with the polymer so that the unstable compound is subjected to as few chemical reactions as possible. Cyanuric chloride has been suggested as a binding agent, but although it has proved feasible to react, for example, a dye with cyanuric chloride and react the resultant compound with cellulose, the reaction of cyanuric chloride with cellulose has not yielded very successful products in that it has not been found possible to produce the dichlorotriazinyl derivatives. These reactions have been carried out by pretreating the cellulose with alkali removing excess alkali and then treating the cellulose with an organic solution of cyanuric chloride. (The use of an organic solution is necessary because cyanric chloride is insoluble in water.) Analysis of derivatives obtained in these prior attempts has given a chlorine/triazine ratio of 1 to 1 or less, indicating that at least one of the two chlorine atoms remaining the ring after its attachment to the polymer was removed. This removal is effected either by hydrolysis which results in a negatively charged oxygen atom being attached to the ring in place of a chlorine atom or by cross-linkage, both of which reduce the activity of the remaining chlorine atom to a very great extent. It has now been discovered that this hydrolysis is very much slower at acid or neutral pH than it is at alkaline pH, and thus the hydrolysis of the group can be substantially prevented if the pH of the reaction medium is made acid or neutral at least after the reaction of the cyanuric chloride with the cellulose. It has also been discovered that no reaction occurs if an organic solution of cyanuric chloride is contacted with cellulose in the complete absence of water.

Thus, according to the present invention a process for producing a polymer having dihalo-s-triazinyl groups bound thereto comprises contacting a polymer having nucleophilic groups with a solution of a cyanuric halide in an inert water-miscible organic solvent in the presence of water and maintaining an acid or neutral pH after reaction has occurred, whereby the tendency to hydrolysis and cross-linking of the polymer is substantially reduced. The polymer may then be filtered off and washed with, for example, acetone and distilled water.

The invention also comprises a polymer having dihalo-s-triazinyl groups bound thereto when produced as described above.

Polymers having nucleophilic groups which can be treated by the process of the invention include natural or synthetic polymers, particularly hydrophilic polymers, for example those having free hydroxyl groups, such as cellulose, substituted celluloses, starch, soluble dextran, various cross-linked dextrans sold under the trademark "Sepahadex" by Pharmacia of Uppsala, Sweden, proteins such as wool, and polyvinyl alcohol. Other polymeric materials which can be used include nylon, terylene, and cellulose acetates. A nucleophilic group is one which donates electrons to, or shares electrons with, the molecule to which it is attached.

The preferred cyanuric halide is cyanuric chloride, although in some instances it may be possible to use the fluoride or the bromide.

The amount of cyanuric halide which becomes attached to the polymer is much greater if the reaction is conducted at alkaline pH than if it is conducted at neutral or acid pH. Thus, although the derivative produced when the reaction is conducted at acid or neutral pH does contain an appreciable amount of dihalo-s-triazinyl groups, a much more fully substituted product is obtained when the solution of cyanuric halide and the polymer are brought into contact at an alkaline pH, and the pH is reduced as soon and as rapidly as possible after the reaction has occurred. The rate of hydrolysis and cross-linking of the dihalo-s-triazinyl groups is to some extent reduced at low temperature, and thus when the reaction is carried out at low temperature, for example, at 2° C. it is not necessary to reduce the pH as soon as when the reaction is carried out at, for example, room temperature. The reaction should, in any case, preferably be conducted at below 35° C.

The pH can, for example, be maintained acid or neutral after reaction has occurred excess cyanuric halide which reacts with the water in the reaction medium producing hydrohalic acid in situe. Alternatively an acid e.g. acetic acid may be added to the reaction medium. The pH is maintained within the range 0 to 7, and particularly within the range 3 to 5.5, such as for example about 4.5.

Preferably the polymer should be pre-treated to open its structure so that the cyanuric halide solution may penetrate as far as possible. This may be done by soaking the polymer in water. An alkali such as sodium hydroxide or sodium bicarbonate may be added to the water so that when the cyanuric halide comes into contact with the polymer the pH at the polymer surface is alkaline.

Since the presence of water is essential to the reaction and cyanuric halides are insoluble in water, the reaction has to be carried out in a mixed solvent. The aqueous part of the solvent will tend to be attracted by the polymer and the organic part will tend to retain the cyanuric halide; hence separating the cyanuric halide from the polymer. This difficulty may be minimised by first adding the polymer to an organic solution of cyanuric halide and then adding water, which will tend to carry both cyanuric halide and the organic solvent with it as it is absorbed by the polymer. When this method is used after the polymer has undergone pre-treatment, the aqueous medium used to open the polymer structure should be substantially removed before the polymer is added to the organic cyanuric halide solution. A particularly advantageous application of this method is as follows:

The polymer is pre-treated in an aqueous solution of alkali, for example, 0.1 N or 1 N NaOH, the excess solution is filtered off, and the polymer brought to a damp-dry state, for example, by sucking on a Buchner funnel. The damp dry polymer is then added to the organic solution of cyanuric halide, stirred, and water is added as soon as the polymer is fairly evenly distributed through the solvent. The alkali remaining on the surface of the polymer ensures that the pH when the cyanuric halide first contacts the polymer is strongly alkaline. The addition of water helps to carry the organic solvent with the cyanuric halide into the polymer structure, and the formation of hydrohalic acid by the reaction of cyanuric halide and water rapidly reduces the pH. An acid such as acetic acid may be added with the water to help reduce the pH.

Preferably sodium bicarbonate is added with the water, as with the acid produced in the reaction this starts to buffer at about pH 4.5, thus maintaining the pH at a suitable level. The above method is particularly suitable for cellulose. If, however, the polymer is one that absorbs a great deal of water, e.g. a "Sephadex" the absorbed water will be extracted by the organic solvent and thus the above method is not practicable. In this case cyanuric halide solution is slowly added to a suspension of Sephadex in a mixed aqueous/organic medium and the pH is maintained at the required degree of alkalinity until reaction has occurred by the addition of aqueous sodium hydroxide. The reaction is conducted at low temperature (e.g. 2° C.) thus slowing down the rate of cross-linking and hydrolysis and leaving time for the cyanuric halide to penetrate the structure.

Suitable inert water-miscible organic solvents for the cyanuric halide include, for example, ketones such as acetone, and dioxane.

The rate of substitution increases as increasing amounts of water are added to the reaction mixture. On the other hand, as more water is added it becomes more difficult to dissolve the cyanuric halide, and the rate of hydrolysis of the cyanuric halide increases. Thus a compromise must be reached in each particular case. In the following examples a volume of water equal to the volume of organic solvent was added.

The derivatives according to the present invention are particularly useful in that the halogen atoms attached to the triazine ring are sufficiently active to allow one of each pair of halogen atoms to attach a molecule of an enzyme or other biologically active substance, and thus the derivatives enable such substances to be bound to a polymeric matrix, as is described in British patent application Nos. 30615/67, 32541/67, 6869/68, 6870/68 and 17322/68. The invention may also be used to form e.g. a dyed cellulose by reacting the cellulose derivative with a dyestuff having an amino group such as an azo dyestuff.

The following examples illustrate the invention.

The amount of s-triazine ring bound to the polymer was estimated by subjecting the polymer to acid hydrolysis to give cyanuric acid which was then estimated spectroscopically by comparison with a solution of cyanuric acid of known strength. Results are given as percent (M/M); i.e. number of moles of substituent per 100 moles of anhydro-glucose units of cellulose.

In detail the method was as follows:

A small amount (about 0.1 g. depending on the degree of substitution) of the cellulose derivative was stirred for 2 hours in 5 ml. of 0.2 N sulphuric acid heated to 100° C. in a waterbath. The liquid was then filtered off, and the solid washed with further 0.2 N sulphuric acid until the total volume of washings and filtrate was exactly 10 ml. 1 ml. of this solution was added to 2 ml. of 0.5 N borate buffer (pH 9.7) to which an excess of sodium hydroxide had been added, in order to neutralise the 0.2 N sulphuric acid. Thus the final pH and the mixture was 9.7 and the final volume 3 ml.

The U.V. spectrum of the solution was recorded and the optical density of the peak, at 2140° A. noted.

The amount of "active" halide atoms (i.e. dihalo-s-triazinyl groups) bound to the polymer was estimated by reacting the polymer with glycine (which does not react appreciably with the single remaining chlorine atoms on hydrolysed or cross-linked groups) to give the derivative:

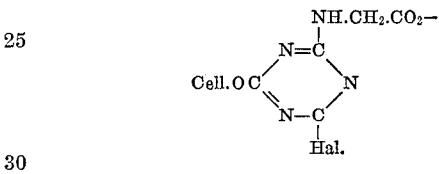

subjecting this derivative to acid hydrolysis to produce an N-substituted ammelide which was then estimated spectroscopically by comparison with the ammelide produced by the acid hydrolysis of 2,4-dihalo-6-carboxymethylamino-s-triazine. The technique is identical to that given above except that there is no need to use borate buffer to adjust the pH of the hydrolysate before reading the optical density and that the optical density is read at 2240° A.

As a confirmation that the species

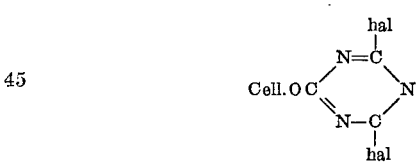

is present, it was found that not only did the analysis give a halide/s-triazine ratio of 2 to 1, but the rate of reaction of the polymer with glycine was almost identical with the rate of reaction of 2,4-dihalo-6-carboxymethoxy-s-triazine with glycine (9.4 litres moles$^{-1}$ sec.$^{-1}$ as against 13 litres moles$^{-1}$ sec.$^{-1}$). For comparison, the rate of reaction of 2-halo-4,6-methoxy-s-triazine with glycine is 0.23 litre mole$^{-1}$ sec.$^{-1}$.

An alternative method of measuring the "active" halide depends on the fact that during the reaction of the dihalo-s-triazinyl derivative with glycine, acid is released, so that the reaction may be followed on a titrator in the usual way, and from the total amount of acid released it is possible to estimate the amount of "active" halide present in the sample.

Results are given as percent (M/M); i.e. number of "active" halide atoms per 100 moles of anhydro-glucose units of cellulose.

An "active" halide/s-triazine ratio of 1 to 1 would indicate that only dihalo-s-triazinyl groups are present. A lower ratio indicates that some hydrolysis or cross-linking has occurred.

EXAMPLE 1

3 grams cyanuric chloride were dissolved in 15 ml. acetone and 3 grams sodium bicarbonate and 3 grams cellulose were added. The mixture was stirred until the cellulose was dispersed throughout the solvent. 5 ml. glacial acetic acid was added and immediately afterwards 15 ml. water was added. The pH of the reaction mixture was 3±0.3. After 10 minutes the cellulose was filtered off washed with acetone and water and dried in a vacuum dessicator over silica gel.

*Analysis:*
    s-triazine—less than 0.01% (M/M)
    "active" chlorine by reaction—less than 0.01% (M/M).

EXAMPLE 2

3 grams cyanuric chloride were dissolved in 15 ml. acetone and 3 grams sodium bicarbonate and 3 grams cellulose were added. The mixture was stirred until the cellulose was dispersed throughout the solvent and then 15 ml. of water were added. Nitrogen was blown through the mixture to remove carbon dioxide. Thus the pH remained at 8 throughout the reaction. 3 minutes after the addition of the water the pH was reduced by adding 25 ml. 20% (v./v.) acetic acid and the cellulose was filtered off washed with acetone and water and dried in a vacuum dessicator over silica gel.

*Analysis:*
    (duplicated) s-triazine 0.047, 0.043% (M/M)
    "active" chlorine by reaction 0.028, 0.027% (M/M).

EXAMPLE 3

As Example 2, except that the sodium bicarbonate was replaced by sodium carbonate, and nitrogen was not blown through the mixer. The pH of the reaction mixture was about 10.

The acetic acid was added 1 minute after the addition of the water.

*Analysis:*
    (duplicate) s-triazine 0.380, 0.389% (M/M)
    "active" chlorine by reaction 0.268, 0.269% (M/M).

EXAMPLE 4

3 grams of cellulose was pre-treated by stirring in 50 ml. 1 N NaOH for 15 minutes, filtering, and sucking the powder to a damp-dry state on a Buchner funnel. 3 grams cyanuric chloride were dissolved in 15 ml. acetone and the pre-treated cellulose added to the solution and stirred until thoroughly dispersed. 15 ml. of water was added and after 10 seconds the pH was reduced by adding 25 ml. 20% (v./v.) acetic acid and the cellulose was filtered off, washed with acetone and water and dried in a vacuum dessicator over silica gel.

*Analysis:*
    (duplicated) s-triazine 2.04, 2.01% (M/M)
    "active" chlorine by reaction 1.21, 1.17% (M/M)
    "active" chlorine by titration 1.34% (M/M).

EXAMPLE 5

5 grams cellulose was pre-treated by stirring in 50 ml. 1 N NaOH for 15 mins., filtering, and sucking the powder to a damp dry state on a Buchner funnel. 5 grams cyanuric chloride was dissolved in 75 ml. acetone and the pre-treated cellulose added to the solution and stirred until thoroughly dispersed. 75 ml. of water containing 5 ml. acetic acid and 5 grams sodium bicarbonate were then added. After 10 minutes the cellulose was filtered off, washed with acetone and water and dried in a vacuum dessicator over silica gel.

*Analysis:*
    s-triazine 2.04% (M/M)
    "active" chlorine by reaction 1.0% (M/M)
    "active" chlorine by titration 1.5% (M/M)

EXAMPLE 6

This example describes the coupling of penicillin amidase to dichloro-s-triazinyl cellulose, and its reaction with benzyl penicillin.

The dichloro-s-triazinyl derivative of Whatman No. 1 cellulose filter paper is prepared by the following method:

Six pieces of 7 centimetres diameter Whatman No. 1 filter paper are soaked in normal sodium hydroxide solution for 5 minutes. The excess sodium hydroxide is removed and the papers are then stirred in 100 millilitres of dioxane for 5 minutes. 5 grams of cyanuric chloride are dissolved in 20 millilitres of dioxane and the papers added to this, followed in 5 seconds by 25 millilitres of water, and in another 5 seconds by 25 millilitres of acetic acid. The liquid is poured off and the papers agitated in dioxane for a few minutes. Equal volumes of water and acetic acid are then added. After 5 minutes the papers are removed and washed with water/acetone mixtures until no smell of cyanuric chloride can be detected. Finally, the papers are dried in a dessicator over silica gel.

Penicillin amidase (7.65 milligrams) in 9 ml. of 0.01–phosphate buffer, pH 7.2 is placed in a small dish. Six sheets of the filter paper derivative (7 cm. in diameter) are dropped into the enzyme solution and allowed to react for 10 minutes. The excess solution is then poured off. A solution of 1 N (3-aminopropyl)-diethanolamine containing 0.9 N HCl is added and the sheets left for several days at room temperature. The sheets are then mounted in a holder and washed through with the phosphate buffer containing sodium chloride. 4.0 milligrams of the enzyme remained attached, and the enzyme retains about 30% of its original activity.

Similar results for benzyl penicillin conversion with the sheets are achieved as for the packed column. Both reactions show no loss of activity after 2 weeks at 37° C.

I claim:
1. A process for the production of a polymer having dihalo-s-triazinyl groups bound thereto which comprises contacting and reacting a polymer having nucleophilic groups with a solution of a cyanuric halide in an inert water-miscible organic solvent in the presence of water at an alkaline pH, reducing the pH after reaction has occurred to 7.0 or below and maintaining the acid or neutral pH, after reaction has occurred whereby the tendency to hydrolysis and cross-linking of the polymer is substantially reduced.

2. A process according to claim 1 in which the cyanuric halide is cyanuric chloride.

3. A process according to claim 1 in which the polymer has free hydroxyl groups.

4. A process according to claim 3, in which the polymer is cellulose, a substituted cellulose, starch, soluble dextran, a cross-linked dextran, or a protein.

5. A process according to claim 3 in which the polymer is polyvinyl alcohol.

6. A process according to claim 1 in which the organic solvent is acetone or dioxane.

7. A process according to claim 1, in which the pH is maintained acid or neutral after reaction has occurred by hydrohalic acid produced in situ by the reaction of cyanuric halide and water.

8. A process according to claim 1 in which acetic acid is added to the reaction medium to help reduce the pH.

9. A process according to claim 1 in which the pH is maintained within the range 3 to 5.5 after reaction has occurred.

10. A process according to claim 1 in which the polymer is first added to an organic solution of cyanuric halide and water is added subsequently.

11. A process according to claim 1 in which the water contains dissolved sodium carbonate.

12. A process according to claim 1 that is carried out at a temperature below 35° C.

13. A process according to claim 1 in which there is used a volume of water equal to the volume of organic solvent.

14. A process according to claim 1 in which the polymer is soaked in water to open its structure prior to reaction with the cyanuric halide.

15. A process according to claim 14 in which an alkali is added to the water in which the polymer is soaked.

References Cited

UNITED STATES PATENTS

| | | | |
|---|---|---|---|
| 2,934,525 | 4/1960 | Fekete | 260—88.1 |
| 3,033,842 | 5/1962 | Holtschmidt | 260—91.3 |
| 3,047,532 | 7/1962 | D'Alelio | 260—45.4 |
| 3,304,297 | 2/1967 | Wegmann et al. | 260—153 |

JOSEPH L. SCHOFER, Primary Examiner

S. M. LEVIN, Assistant Examiner

U.S. Cl. X.R.

260—78, 78.4, 112, 212, 227, 230, 233.3, 233.5; 424—94, 116

UNITED STATES PATENT OFFICE
CERTIFICATE OF CORRECTION

Patent No. 3,557,073      Dated January 19, 1971

Inventor(s) Garth Kay

It is certified that error appears in the above-identified patent and that said Letters Patent are hereby corrected as shown below:

Column 7, line 6, add:

16. A process according to claim 1, in which the polymer is subsequently reacted with a dyestuff having an amino group.

In the heading to the printed specification, line 11, "15 Claims." should read -- 16 Claims. --.

Signed and sealed this 22nd day of June 1971.

(SEAL)
Attest:

EDWARD M. FLETCHER, JR.
Attesting Officer

WILLIAM E. SCHUYLER, JR.
Commissioner of Patents